Feb. 22, 1955 J. L. SMITH 2,702,567
LUMBER HANDLING TABLE
Filed May 11, 1954 10 Sheets-Sheet 1
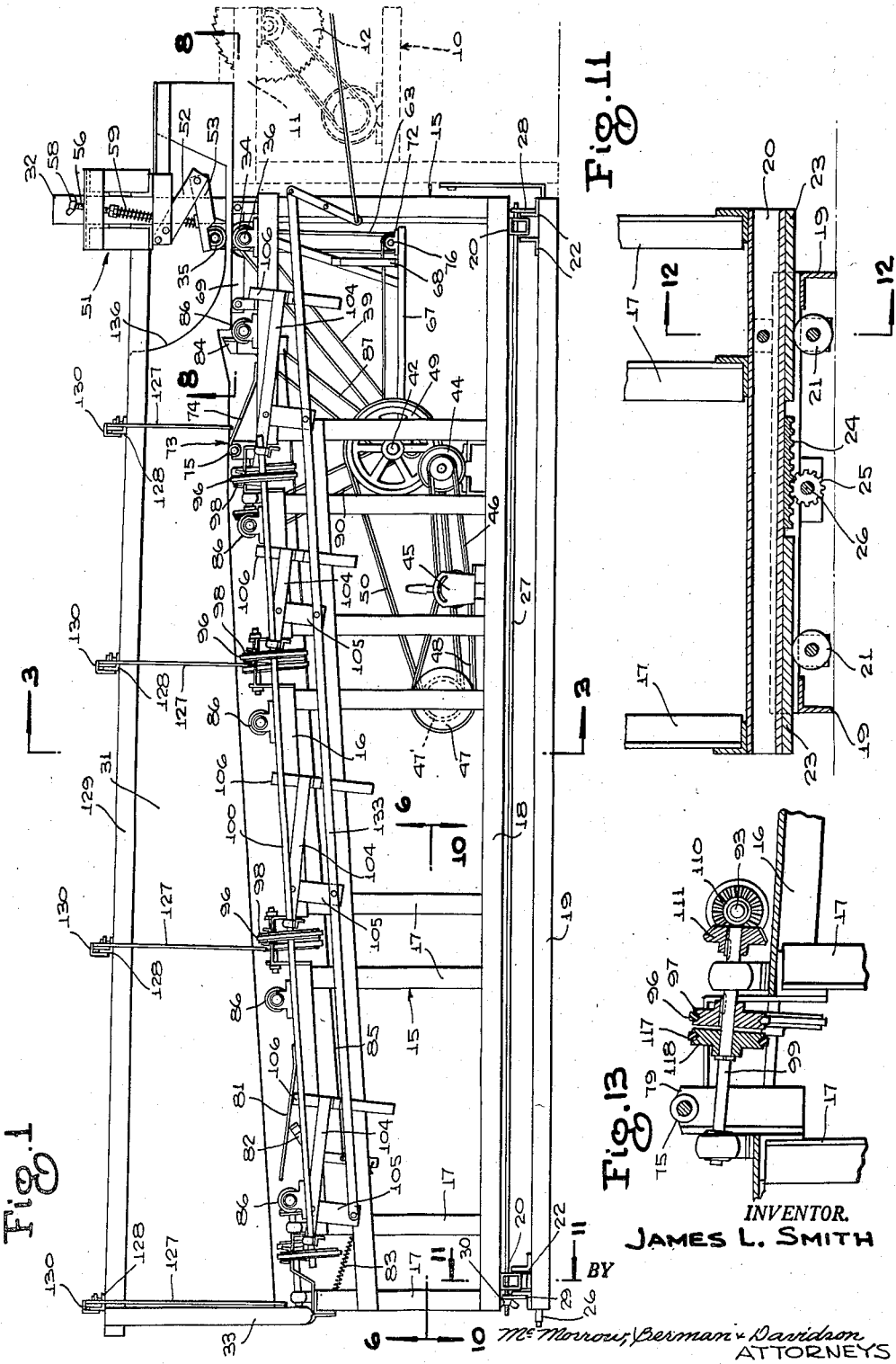
INVENTOR.
JAMES L. SMITH
BY
McMorrow, Berman & Davidson
ATTORNEYS Feb. 22, 1955   J. L. SMITH   2,702,567
LUMBER HANDLING TABLE
Filed May 11, 1954   10 Sheets-Sheet 2
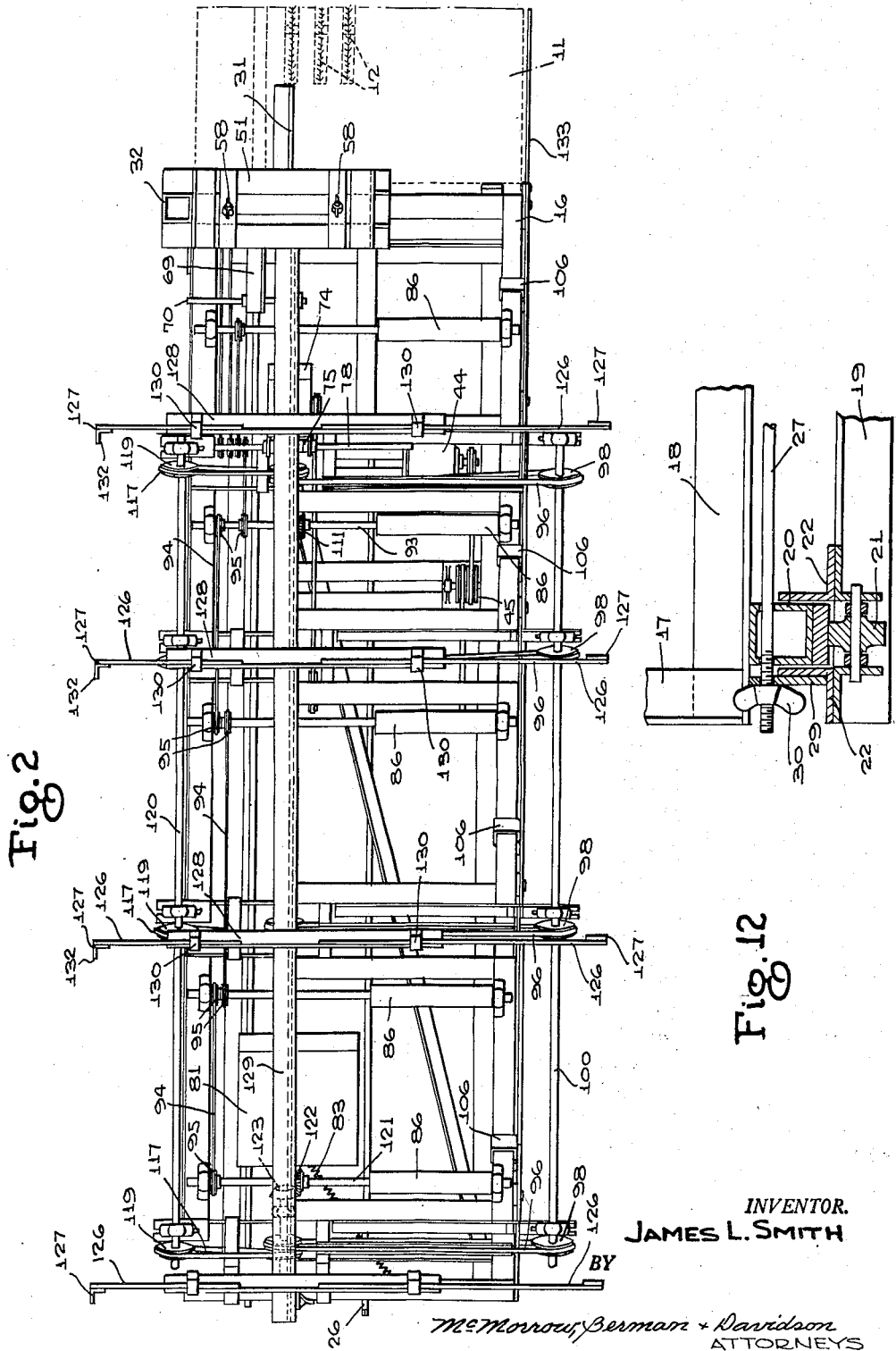
INVENTOR.
JAMES L. SMITH
BY
McMorrow, Berman & Davidson
ATTORNEYS Feb. 22, 1955     J. L. SMITH     2,702,567
LUMBER HANDLING TABLE
Filed May 11, 1954     10 Sheets-Sheet 3
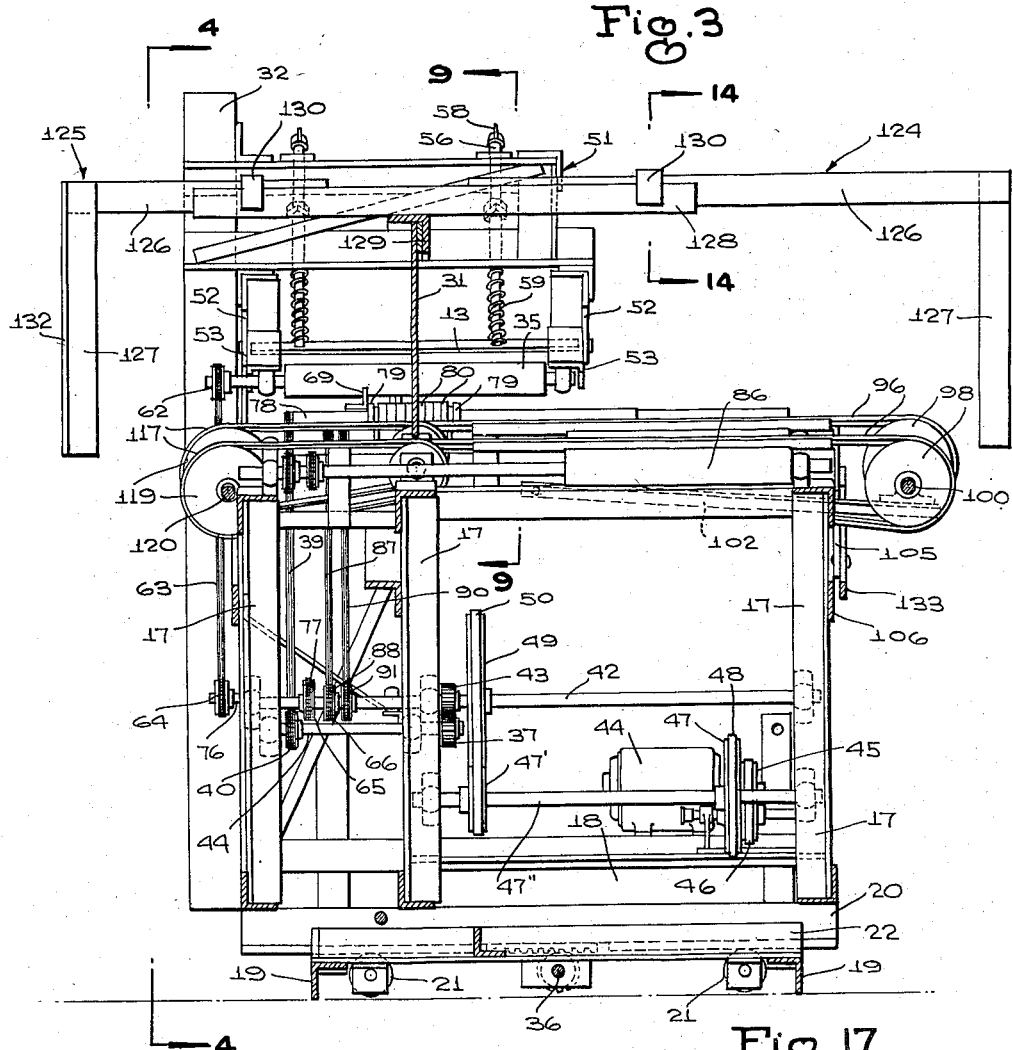
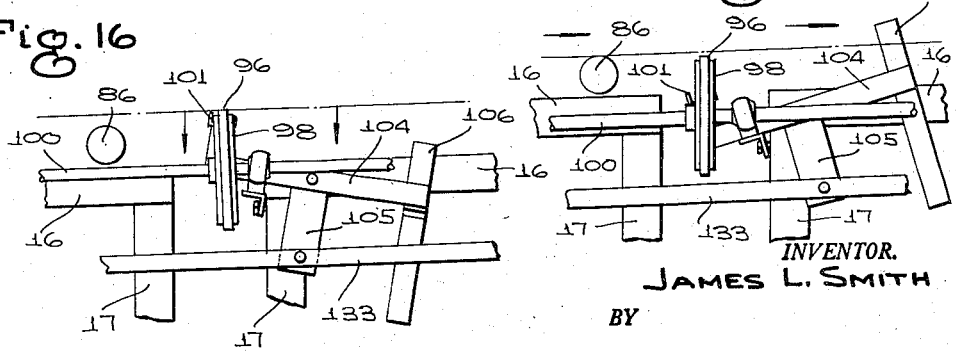
INVENTOR.
JAMES L. SMITH

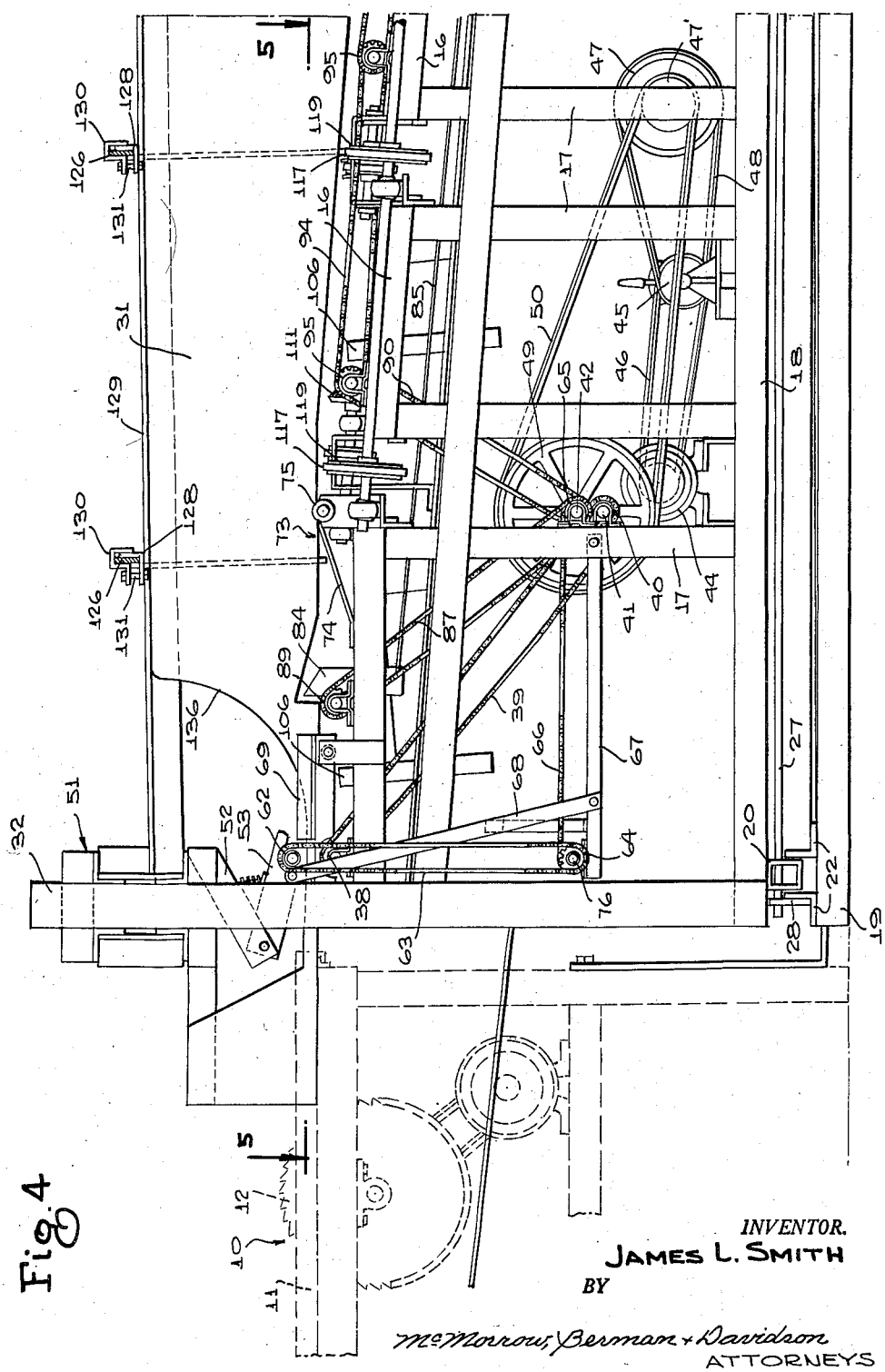

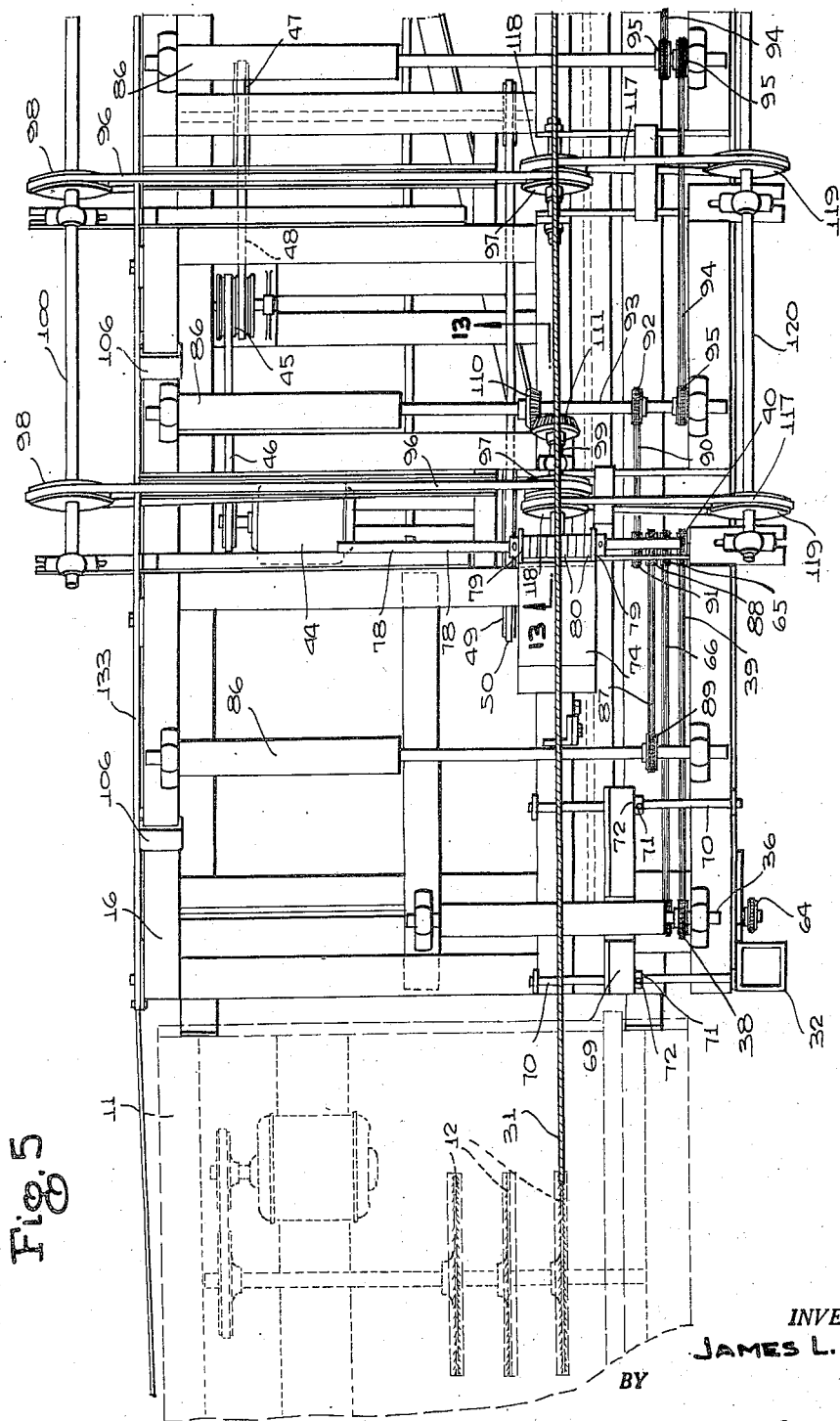

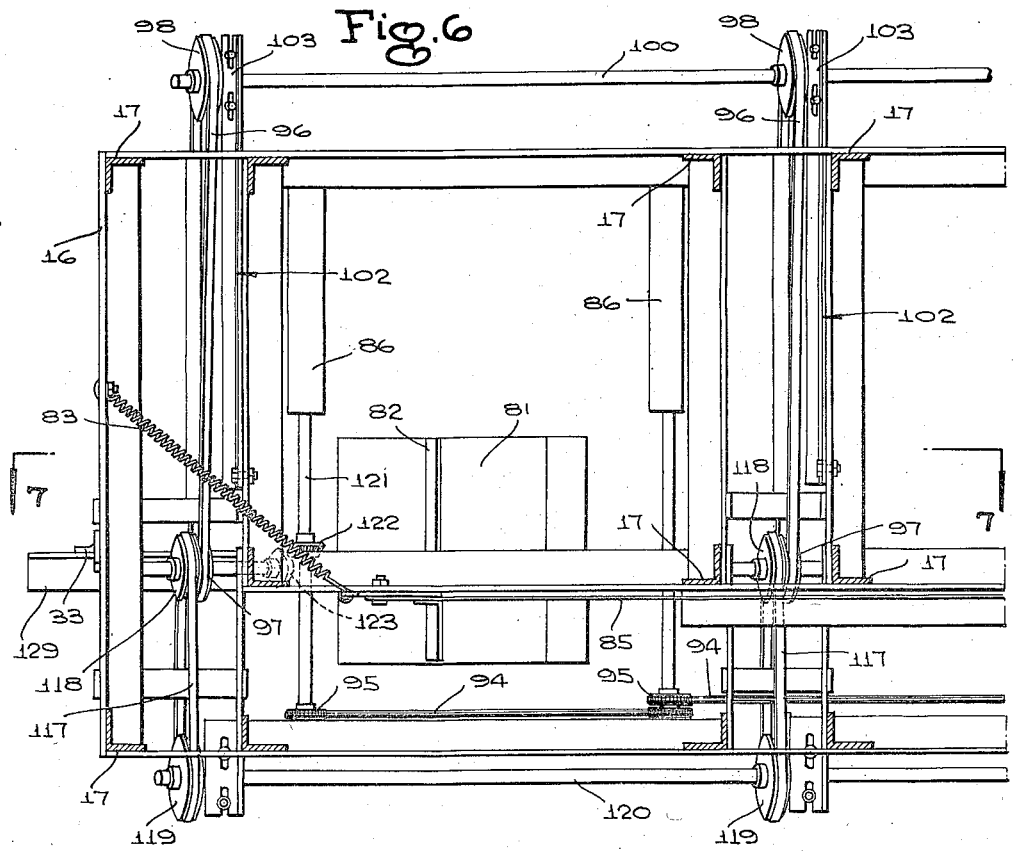
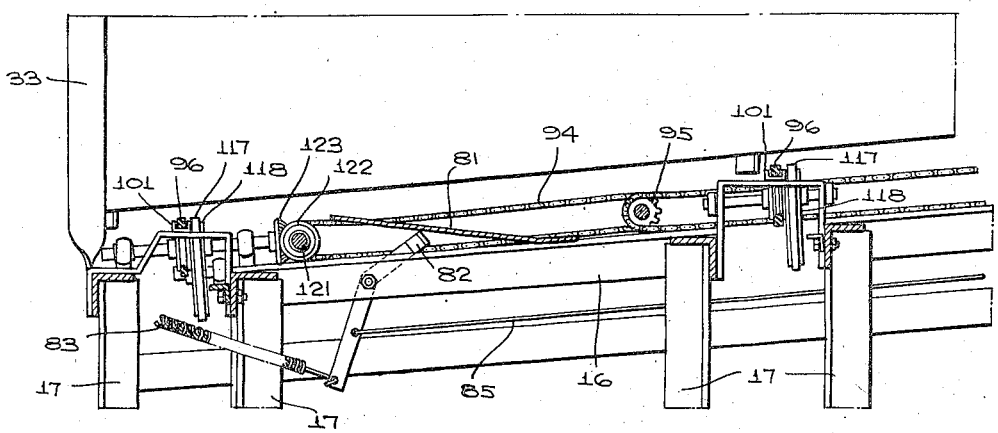

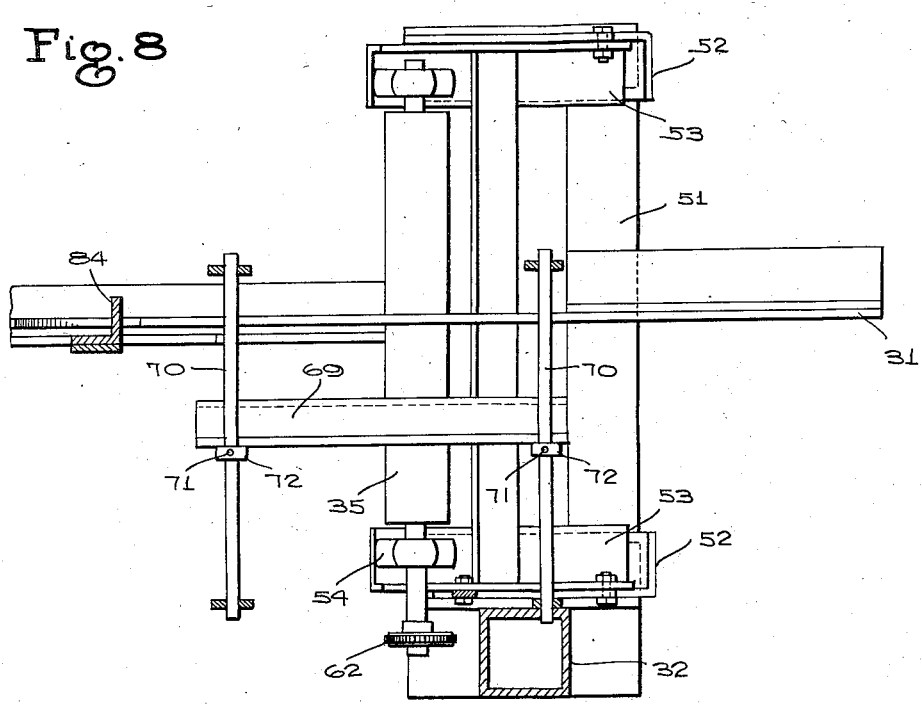
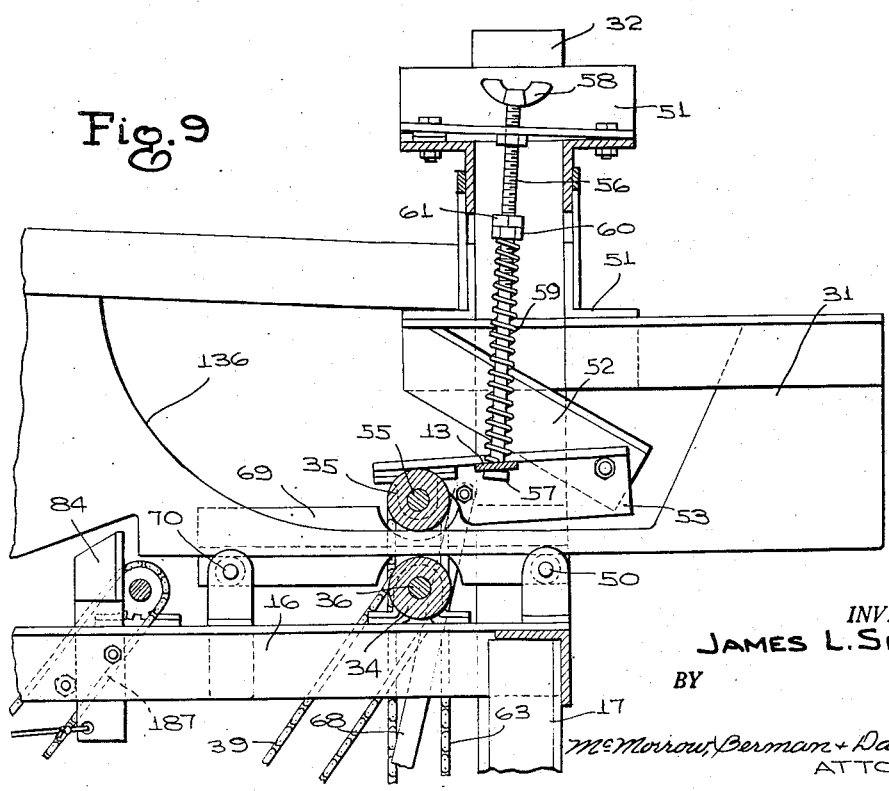

Feb. 22, 1955 J. L. SMITH 2,702,567
LUMBER HANDLING TABLE
Filed May 11, 1954 10 Sheets-Sheet 8
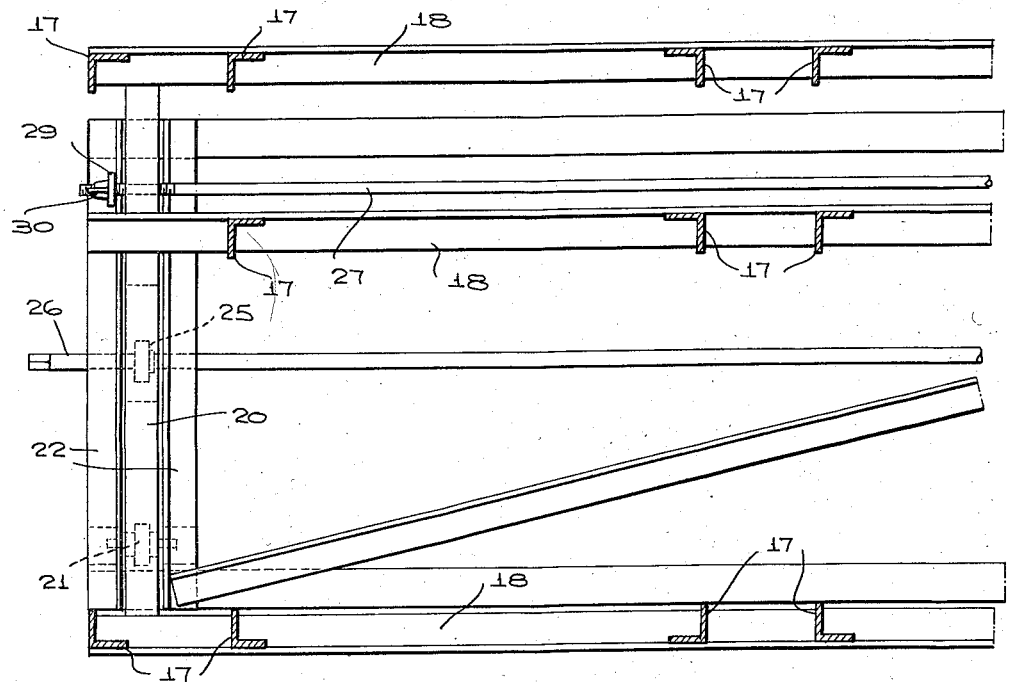
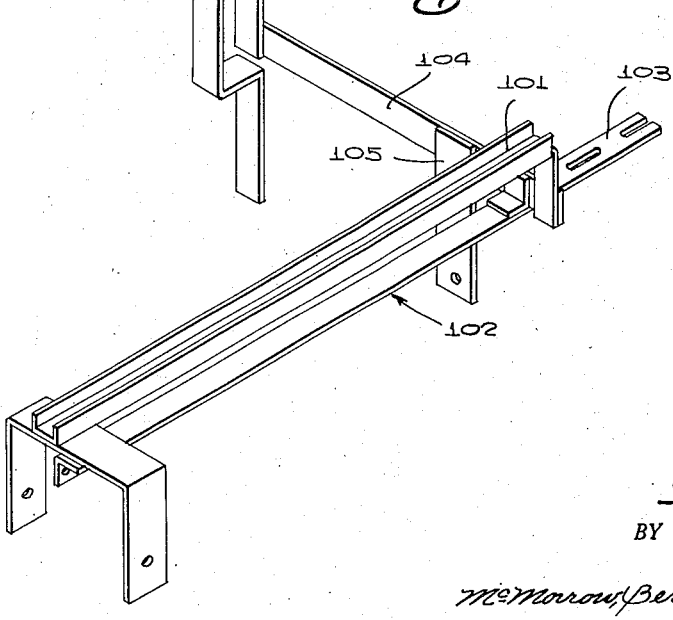
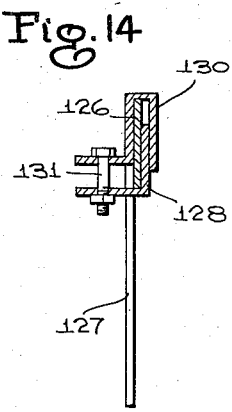
INVENTOR.
JAMES L. SMITH
BY
McMorrow, Berman & Davidson
ATTORNEYS

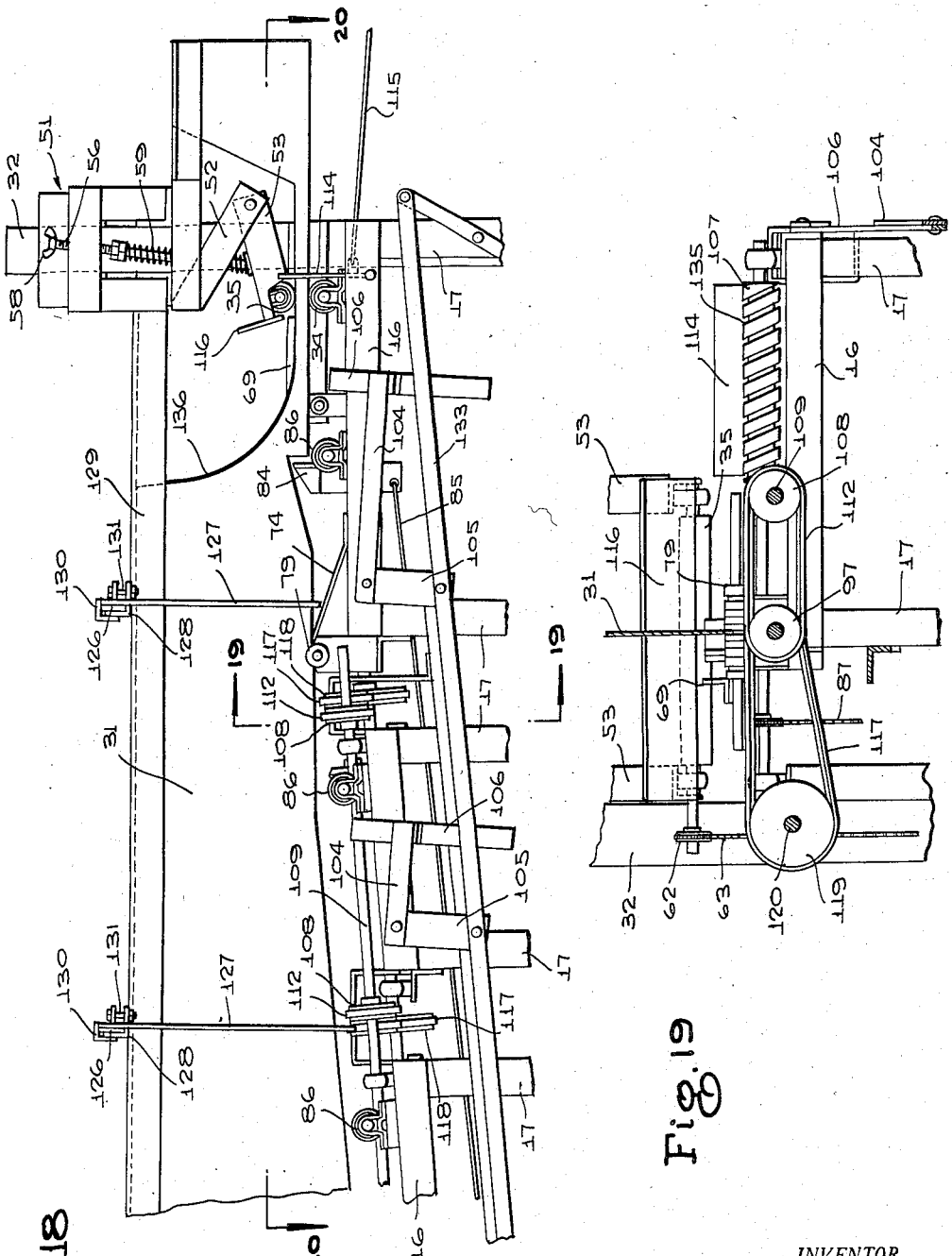

Feb. 22, 1955    J. L. SMITH    2,702,567
LUMBER HANDLING TABLE
Filed May 11, 1954    10 Sheets-Sheet 10

INVENTOR.
JAMES L. SMITH
BY
McMorrow, Berman & Davidson
ATTORNEYS

United States Patent Office 2,702,567
Patented Feb. 22, 1955

2,702,567

LUMBER HANDLING TABLE

James L. Smith, Charlotte, N. C.

Application May 11, 1954, Serial No. 428,907

12 Claims. (Cl. 143—132)

This invention relates to lumber handling tables.

An object of the invention is to provide a lumber handling table for use in conjunction with a sawing machine, which table will pull lumber pieces through the saws and selectively deposit the sawed parts over either of the sides of the table, or return such parts to the operator located at the saws.

Another object of the invention is to provide a lumber handling table for use in conjunction with a sawing machine which table will pull lumber pieces through the saws and deposit the sawed parts over either of the sides of the table or return such parts to the one side at which the operator is located at the saws.

A further object of the invention is to provide a lumber handling table for use in conjunction with a sawing machine, which table will pull lumber pieces through the saws and selectively deposit some of the sawed parts over one of the sides of the table and other of the sawed parts over the other side of the table.

A further object of the invention is to provide a lumber handling table for use in conjunction with a sawing machine, which table is adjustable for different widths and thicknesses of the lumber pieces to be handled.

Other objects and advantages of the invention will appear from the following description considered in conjunction with the attached drawings, in which:

Figure 1 is a longitudinal elevational view of the lumber handling table of the present invention in association with a sawing machine.

Figure 2 is a plan view of the assembly of Figure 1.

Figure 3 is an enlarged sectional view taken on the line 3—3 of Figure 1.

Figure 4 is a fragmentary view, partially in section, viewed in the direction of the line 4—4 of Figure 3.

Figure 5 is a fragmentary view, partially in section, viewed in the direction of the line 5—5 of Figure 4.

Figure 6 is an enlarged fragmentary sectional view, viewed in the direction of the line 6—6 of Figure 1.

Figure 7 is a sectional view taken on the line 7—7 of Figure 6.

Figure 8 is an enlarged fragmentary sectional view taken on the line 8—8 of Figure 1.

Figure 9 is an enlarged fragmentary sectional view taken along the line 9—9 of Figure 3.

Figure 10 is an enlarged fragmentary sectional view taken on the line 10—10 of Figure 1.

Figure 11 (Sheet 1) is an enlarged fragmentary sectional view taken on the line 11—11 of Figure 1.

Figure 12 (Sheet 2) is an enlarged fragmentary sectional view taken on the line 12—12 of Figure 11.

Figure 13 (Sheet 1) is an enlarged fragmentary sectional view taken on the line 13—13 of Figure 5, illustrating one of the drive connections for the opposed side conveying means.

Figure 14 (Sheet 8) is an enlarged fragmentary sectional view taken on the line 14—14 of Figure 3.

Figure 15 is a perspective view of one of the supporting units, including the stop, for each belt conveyor of the shiftable conveyor bed.

Figure 16 (Sheet 3) is a fragmentary diagrammatic view illustrating the position of the supporting unit of Figure 15 after its shiftable conveyor bed has been moved to a level above the fixed conveyor bed.

Figure 17 is a diagrammatic view of the same assembly of Figure 16 but illustrating the position of the supporting unit after its shiftable conveyor bed has been moved to a level below the fixed conveyor bed.

Figure 18 (Sheet 9) is an enlarged fragmentary longitudinal elevational view of a modified form of the lumber handling table of the present invention.

Figure 19 is a sectional view taken on the line 19—19 of Figure 18.

Figure 20:
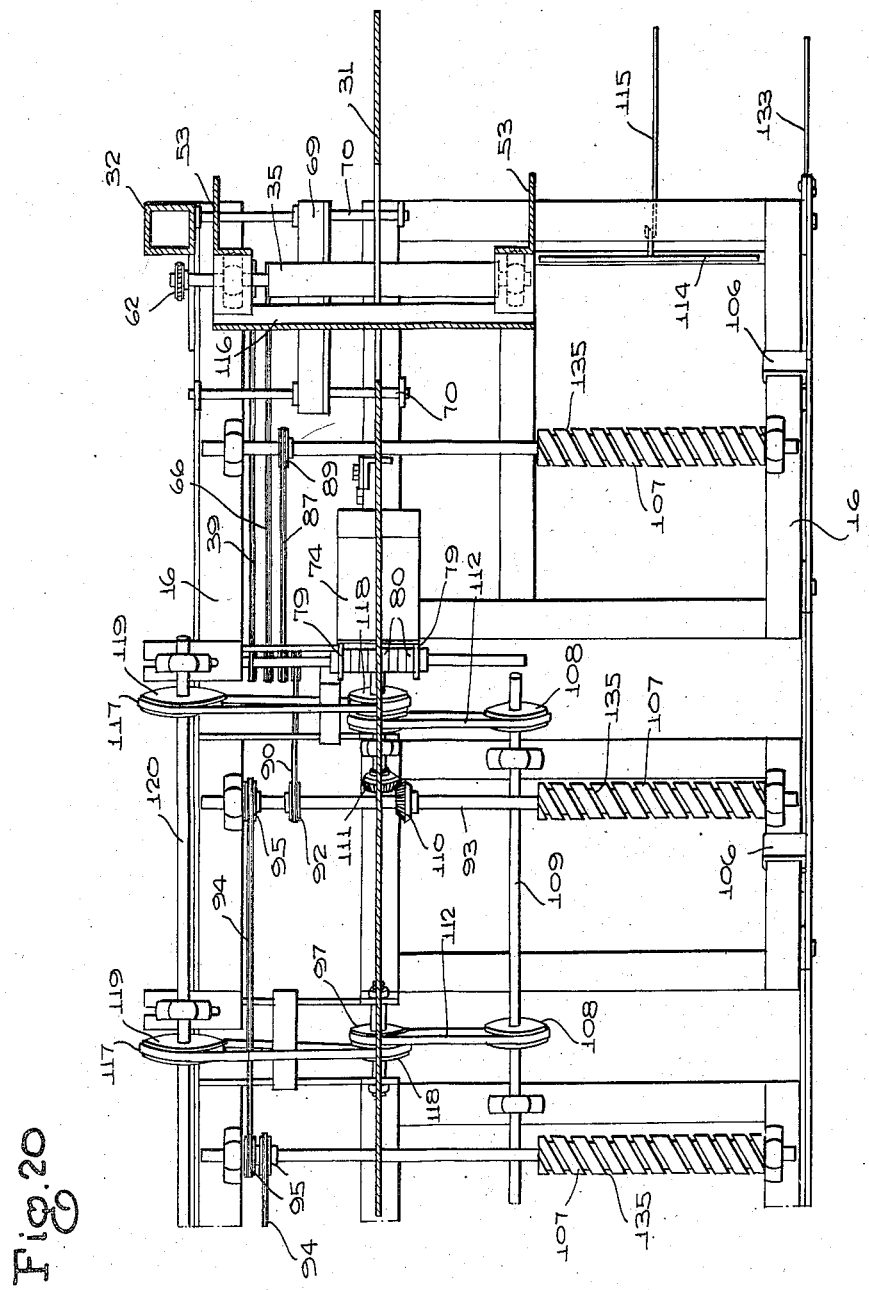
Figure 20 is a view, partly in section, viewed in the direction of the line 20—20 of Figure 18.

Referring to the drawings, the reference numeral 10, Figures 1 and 2, designates generally a sawing machine including a platform 11 having a plurality of rotatable rip saws 12, each having a portion projecting above the platform 11. A lumber handling table, generally designated 15, Figures 1 and 2, embodying the present invention, is arranged in longitudinal alignment with respect to the saws 12, the table 15 being movable transversely of the saws 12. The table 15 has a top 16 which is slightly below the level of the platform 11 and which slopes downwardly away from the platform 11. The legs 17 of the table 15 are secured to a bottom frame 18, the frame 18 being connected to a base 19 for movement transversely of the saws 12. As shown in Figures 11 and 12, the frame 18 has secured to the under face thereof a pair of spaced cross members 20, each of which has dependingly carried by the under face thereof a pair of spacer plates 23. The spacer plates 23 of each cross member 20 slidably engage complemental rollers 21 carried by an adjacent trackway 22 on the base 19. The portion of the under face of each cross member 20 between the pair of spaced plates 23 carries a rack 24 which is in meshing engagement with a pinion 25, the two pinions 25 being carried by a rotatable shaft 26 extending longitudinally of the frame 18 and supported in the trackways 22. One end of the shaft 26 projects exteriorly of the end of the table 15 remote from the machine 10 and is provided with means for the attachment of a crank or wrench for the rotation of the shaft 26. Rotation of the shaft 26 is effective, through the action of the pinions 25 and racks 24 to cause the lateral movement of the table 15 transversely of the saws 12. A locking bar 27 extends longitudinally of the table 15 between the bottom frame 18 and the base 19 and is slidably carried by the cross members 20. The end of the bar 27, Figure 1, adjacent the machine 10 is fixedly secured to a plate 28. The other end of the bar 27 carries a plate 29 which is slidable thereon, the portion adjacent the other end of the bar 27 being threaded and engaged by a wing nut 30 which, when tightened, forces the plates 28 and 29 into frictional engagement with the respective facing sides of the adjacent trackways 22 to lock the frame 18 against movement upon the base 19.

Positioned longitudinally of and spaced above the top 16 of the table 15, intermediate the sides thereof and carried by the table, is an upstanding separator blade 31, Figures 1 and 4. The blade 31, consisting of a strip of metal thin enough to be received in a saw cut made by the saws 12, extends the length of the top 16 of the table 15 and projects over the adjacent portion of the platform 11, the blade being supported at its ends by means of an upright 33 and a reinforced head 51 carried by an upright 32 which uprights rise from the table 15.

Feed rollers 34 and 35, disposed one above the other, are positioned transversely of the table 15, adjacent the end thereof contiguous to the saws 12, for pulling sawed lumber pieces onto the table 15. The rollers 34 and 35 are carried by the table 15 and have one end portion to one side of the blade 31 and spaced from the complemental side of the table 15 and have the other end portion on the other side of the blade 31 and spaced from the other side of the table 15. The blade 31 is cut away, as shown at 136, to accommodate the roller 35.

The lower roller 34, Figures 1, 3, 4, 8 and 9, is carried by a shaft 36 which has its ends rotatably supported on the top 16 of the table 15. A sprocket wheel 38, Figure 5, is carried upon the shaft 36 and is driven by a chain 39 which, in turn, is driven by a sprocket 40 fixed upon a stub shaft 41 driven from a shaft 42 by reason of meshing pinions 37 and 43. The shaft 42 receives its rotation from a motor 44, mounted upon the frame 18, through a system of belts and pulleys including a speed regulator pulley 45, driven from the motor 44 by a belt 46, a first reduction pulley 47 carried by a shaft 47″ and driven from the pulley 45 by a belt 48 and a second reduction pulley 49 keyed upon the shaft 42 and driven from the pulley 47' by a belt 50, the pulley 47' being also carried by the shaft 47".

The upper roller 35, Figures 1, 3, 4, 8 and 9, is dependingly supported from the reinforced head 51 extending transversely above the table top 16 and connected at one end to the upright 32. A first arm 52 depends at an angle from each end of the head 51 and is fixedly secured thereto. A second arm 53 is pivoted at one end to the lower end of each of the first arms 52, and carries, adjacent its free end, a bearing housing 54. Extending between and journaled in the bearing housings 54 is a shaft 55 upon which the roller 35 is mounted. The angular positioning of the arms 53 with respect to the arms 52 is controlled by bolts 56 which extend upward slidably through a cross piece 13 connecting the arms 53, intermediate their ends, with the heads 57 of the bolts 56 supporting the cross piece 13 and the arms 53 and the shanks of the bolts 56 threaded through the head 51. The shank ends of the bolts 56 extend above the head 51 and are each provided with a winged end 58 by which the bolts 56 may be threaded into or out of the head 51 to lower or raise the level of the free ends of the arms 53 and thus lower or raise the roller 35. A coiled spring 59 surrounds the lower portion of each bolt 56 and is compressed between the arms 53 and a nut 60, threadably engaged upon the bolt 56 intermediate its ends and releasably held in position by a lock nut 61, the springs 59 thus resiliently urging the cross piece 13 downwardly toward its seated position upon the bolt heads 57. One end of the shaft 55 extends exteriorly of the complemental housing 54 and arm 53 and carries a sprocket wheel 62, Figures 3 and 4. The sprocket wheel 62 is driven by a chain 63 from a sprocket 64 on one end of a stub shaft 76. A sprocket 77 on the shaft 76 adjacent its other end, receives its motion from the shaft 42 through a sprocket 65 on that shaft and a chain 66 connecting the sprocket 65 and the sprocket 77. The shaft 76 carrying the sprockets 64 and 77 is supported upon one of the ends of a pair of arms 67, the other end of the arms being pivotally connected to the adjacent legs 17. An upright link 68 connects the support member 67 and the arm 53, adjacent the upright 32, so that the raising and lowering of the arm 53 is accompanied by corresponding raising and lowering of the member 67, maintaining the spacing of the sprockets 62 and 64 and thus the appropriate tension upon the chain 63.

A fence 69, Figures 8 and 9, extends longitudinally of the table 15 and between the rollers 34 and 35, upon the side of the separator blade 31 adjacent the upright 32 and is slidably supported, adjacent its ends, upon bars 70 spaced above and connected to the table top 16; the fence 69 being movable laterally on the bars 70. The fence 69 may be releasably fastened in any of its lateral movement positions by means of set screws 71 carried in bosses 72 formed on the fence 69 and surrounding the bars 70.

An upstanding support 73, Figures 1 and 4, for supporting the lumber pieces as they are being pulled through the feed rollers 34 and 35, is fixedly carried by the table 15 and is arranged inwardly of and in spaced parallel relation with respect to the rollers 34 and 35. The support 73 consists of an upwardly inclined plate 74 and a roller 75, adjacent and approximately at the level of the upper end of the plate 74, the roller 75 being mounted on a shaft 78 rotatably supported upon spaced uprights 79, Figure 13, carried by the table top 16. The roller 75 is made up of a plurality of roller elements 80, Figure 3, mounted on the shaft 78, the number of the elements and the spacing between the supporting uprights 79 being variable to vary the length of the roller 75.

An upright resilient plate 81, Figures 1, 6 and 7, is arranged inwardly of, and in spaced parallel relation with respect to, the support 73 and is connected to the table top 16 for up and down movement about a fixed horizontal axis, for supporting the work pieces as they are received from the support 73. The plate 81 is inclined upwardly away from the support 73 and the upwardly inclined portion rests upon one end of an upright lever 82 pivoted, intermediate its ends, to the table 15 with its upper end projecting above the level of the table top 16. The other end of the lever 82 is connected to one end of a spring 83 which has its other end connected to the table 15 inwardly of the lever 82 and tends to rotate the lever 82 so as to lower its upwardly projecting end and thus the upwardly inclined portion of the plate 81.

Positioned between and in parallel spaced relation with respect to the support 73 and the feed rollers 34 and 35, is an upstanding trip arm 84, Figures 1 and 4, connected to the table 15 intermediate its ends, for rocking movement about a horizontal axis. The trip arm 84 is operatively connected to the plate 81 and is operable, upon engagement with the work pieces as they are being received by the support 73, to shift the plate 81 to its up movement position. The upper end of the trip arm 84 extends above the level of the lower feed roller 34 and the support 73, the lower edge of the blade 31 being notched to accommodate it. The lower end of the arm 84 is connected by a rod 85 to the downwardly extending portion of the lever 82, intermediate the pivot point and the point of attachment of the spring 83, in such a manner that pivotal movement of the arm 84 will be accompanied by a corresponding pivotal movement of the lever 82.

On the side of the separator blade 31 remote from the upright 32 and inwardly of the feed rollers 34 and 35, are conveying means carried by the table 15. The conveying means consist of a first conveyor bed having conveying elements, spaced from the separator blade 31 and adjacent the said side of the table 15, the conveying elements of said bed being movable longitudinally of the table 15 for discharging the work pieces delivered from the plate 81, to the end of the table 15 adjacent the feed rollers 34 and 35; and a second conveyor bed having conveying elements extending from the separator blade 31 to the said side of the table 15, the conveying elements of said second bed being movable transversely of the table 15 for discharging the work pieces delivered from the plate 81, from the complemental side of the table 15, the conveying elements of the second conveyor bed being shiftable to a position above the level of the first conveyor bed and to a position below the level of said conveyor bed.

The first conveyor bed comprises a plurality of spaced conveying elements or rollers 86 rotatably mounted on the table top 16 and being below the level of the trip arm 84 and the support 73. The roller 86, adjacent the feed rollers 34 and 35, is driven from the shaft 42 by a chain 87, Figures 3 and 4, which is in engagement with a sprocket 88 on the shaft 42 and a sprocket 89 on the shaft of the roller 86. The roller 86 next removed from the feed rollers 34 and 35 is driven from the shaft 42 by a chain 90 which is in engagement with a sprocket 91 on the shaft 42 and a sprocket 92 on the shaft 93, Figure 13, of the said roller 86. The other rollers 86 of the first conveyor bed are driven successively from the shaft 93 by chains 94, Figure 1, connecting sprockets 95 on each successive roller shaft.

The second conveyor bed comprises a plurality of spaced conveying elements or conveyor belts 96, Figures 3 and 5, each extending about a pulley 97 positioned beneath the separator blade 31 and a pulley 98 positioned exteriorly of the complemental side of the table 15. The pulleys 97 are mounted upon stub shafts 99 carried on the table top 16. The pulleys 98 are mounted upon a shaft 100, extending longitudinally of the complemental side of the table 15, for rotation with the shaft 100. The pulley 97 nearest the feed rollers 34 and 35 is keyed to its complemental stub shaft 99 and driven from the shaft 93 through the meshing beveled gears 110 and 111. The motion of the said pulley 97 is transmitted to the complemental pulley 98 and the shaft 100 by the belt 96 and is transmitted by the shaft 100 to the remainder of the conveyor bed. Each belt 96 is supported in a guideway 101 of a supporting unit 102, Figures 1, 15, 16 and 17, each unit 102 being pivoted at one end to the table 15, adjacent the complemental pulley 97, for upward and downward shifting movement. The free ends of the unit 102 are provided with extensions 103 upon which the shaft 100 is rotatably supported, the shaft 100 and the pulleys 98 thus being shiftable upwardly and downwardly with the units 102 to shift the outer end of the second conveyor bed selectively to a position above or a position below the level of the first conveyor bed. An arm 104 extends to one side of the free end of each unit 102 and carries a depending piece 105. Each arm 104 is pivotally connected at the point of connection with the piece 105 to an adjacent portion of the side of the table 15 for rocking movement about a horizontal axis, the rocking movement of the arm 104 being effective to cause the upward and downward shifting movement of the complemental unit 102. The lower ends of the pieces 105 are pivotally connected to an actuator rod 133, which extends longitudinally of the table 15 and is movable longitudinally to cause the rocking movement of the arms 104 to move the conveying elements of the second conveyor bed selectively to a position above, or a position below, the level of the first conveyor bed.

Also carried by the second conveyor bed, specifically by the free end of each arm 104, is upstanding abutment means, consisting of an abutment element 106, Figures 1, 15, 16 and 17, movable to a position below the complemental side of the table 15 when the conveying elements of the second conveyor bed is shifted to its position above the level of the first conveyor bed, Figure 16, and movable to a position above the complemental side of the table 15 when the conveying elements of the second conveyor bed is shifted to its position below the level of the first conveyor bed, Figure 17. The movement of the actuator rod 133, so as to lower the end of the arm 104 connected to the unit 102, raises the other end of the arm 104, carrying the upper portion of the element 106 above the level of the first conveyor bed.

If desired, alternative forms of the first and second conveyor beds, as shown in Figures 18, 19 and 20, may be substituted for the forms described above. In the alternative form, conveying elements or rollers 107 having spiral serrations 135, replace the rollers 86 of the first conveyor bed and the second conveyor bed is replaced by a shorter bed extending from the separator blade 31 only to the adjacent end of the rollers 107, the conveying elements of the second conveyor bed in the alternative form, being movable transversely of the table 15 for discharging work pieces, delivered from the plate 81, to the rollers 107. The second conveyor bed in the alternative form consists of a plurality of conveyor belts 112 each extending about one of the pulleys 97 and a pulley 108 mounted upon a shaft 109 which extends longitudinally of the table 15 and is connected to the table 15 intermediate the blade 31 and said one side of the table 15. The drive is applied to the pulley 97 nearest the feed rollers 34 and 35 through the bevelled gears 110 and 111, as in the preferred form of the conveying means above described, and is transmitted through the complemental pulley 108 and the shaft 109 to the rest of the conveyor bed.

In the alternative form just described, there are no supporting units 102 for the second conveyor bed. However, the arms 104, each having the depending piece 105 on one end and the upstanding abutment element 106 on the other end, are pivoted at their one end to the adjacent side of the table 15 and are rockable to move the elements 106 selectively above or below the level of the first conveyor bed.

Also in the alternative form, a stop, or plate, 114 is positioned at the end of the table 15 adjacent the feed rollers 34 and 35 and is connected to the table 15 for movement from a horizontal position to a vertical position. The stop 114, upon execution of its movement to the vertical position, coacts with means formed on the first conveyor bed to discharge the work pieces, delivered from the plate 81, from the complemental side of the table 15. The stop 114 is pivotally connected at one side to the table 15 and is movable, by means of a rod 115 connected thereto, from a horizontal position to a vertical position, in which latter position the stop 114 prevents work pieces carried by the rollers 107 from moving back in the direction of the sawing machine 10 and thus coacts with the serrations 135 upon the rollers 107 to discharge the work pieces from the side of the table 15. A further stop 116 is fixed in an upright position upon the free ends of the arms 53 to prevent work pieces from moving backwardly against the arms 52 and 53 or the head 51.

Positioned on the other side of the blade 31 from the first and second conveyor beds and inwardly of the feed rollers 34 and 35, is a third conveyor bed having conveying elements carried by the table 15, Figures 2, 3, 4 and 5. The conveying elements of the third conveyor bed is movable transversely of the table 15 for discharging the work pieces delivered from the plate 81, from the other side of the table 15. The third conveyor bed consists of a plurality of spaced conveying elements or belts 117, each belt 117 extending about a pulley 118, rotatably mounted upon the complemental stub shaft 99, and about a pulley 119 exteriorly of the other side of the table 15. The pulleys 119 are mounted upon a shaft 120, which extends longitudinally of the other side of the table 15, for rotation with the shaft 120. The third conveyor bed is driven from the shaft 121 of the roller 86 remote from the feed rollers 34 and 35. A beveled gear 122 on the shaft 121 drives a meshing beveled gear 123, Figures 6 and 7, on the adjacent stub shaft 99 through which the motion is transmitted to the pulley 118 keyed to the said shaft 99. The rotation of the pulley 118 is conveyed by the belt 117 to the complemental pulley 119 and the shaft 120 and by the shaft 120 to the remainder of the third conveyor bed, the other pulleys 118 being freely rotatable upon their complemental stub shafts 99.

Arranged along each of the sides of the table 15, are guide members 124 and 125, Figures 1, 3, 4, and 14, each of which is connected to the table 15 for movement toward and away from the complemental side of the table 15. Each of the members 124 and 125 consists of a horizontally disposed leg 126 and a vertically disposed leg 127 depending from one end of the leg 126. The legs 126 are arranged in spaced alignment, transversely of and spaced above the table 15 and have the portions adjoining their other ends slidably supported in a horizontal support 128 arranged transversely of the table 15 and secured upon the top of the bar 129 which overlies the blade 31 and is connected at one end to the head 51 and at the other end to the upright 33. The legs 126 are secured to the support 128 by clips 130, tightenable to the support 128 by bolts 131, to hold the legs 126 in any of their sliding movement positions in the support 128. The legs 126 extend beyond the complemental sides of the table 15 and the lower ends of the legs 127 are adjacent to and spaced outwardly from the adjacent sides of the table 15, the outward spacing of the legs 127 from the complemental sides of the table 15 being variable by the sliding of the legs 126 in the support 128. The member 125 being shorter and projecting outwardly a shorter distance from the support 128 than the member 124, has its depending leg 127 provided with additional weight in the form of a flange 132 to counterbalance the effect of the greater length of the member 124.

To prepare the lumber handling table of the present invention for use with a sawing machine 10, the table 15 is moved transversely of the saws 12 by means of a crank or wrench applied to the projecting end of the shaft 26, until the table 15 is in a position with respect to the saws 12 considered most appropriate for handling the lumber pieces to be sawed. The members 124 and 125 are also adjusted upon the support 128 so that the depending legs 127 are appropriately spaced from the sides of the table 15 for the widths in which the lumber pieces are to be sawed. If a part of the pieces to be sawed is to be returned to the operator for resawing, the actuator rod 133 is moved so as to lower the outer end of the second conveyor bed below the level of the first conveyor bed and raise the abutment elements 106 above the level of the first conveyor bed to the position shown diagrammatically in Figure 17. In this case the transverse setting of the table 15 with respect to the saws 12 is made such that the saw cut between the part of the lumber piece to be returned to the operator and the other part of the lumber piece will be aligned with and will receive the separator blade 31 as the sawed piece moves onto the table 15. The distance between the feed rollers 34 and 35 is then adjusted, by means of the bolts 56, to suit the thickness of the lumber pieces to be sawed. The motor 44 is now turned on and the speed of the conveyor beds adjusted by means of the speed regulator pulley 45. The table is now ready to receive the lumber pieces from the saws.

In commencing the operation, the operator feeds an end portion of the first lumber piece through the saws 12 and engages the sawed end between the feed rollers 34 and 35 which then draw the piece the rest of the way through the saws and onto the table 15. In feeding the piece to the saws, the operator is careful to position it so that the part of the piece to be returned for resawing will be on the side of the separator blade 31 on which the first and second conveyor beds are located and the portion not to be returned is on the other side of the separator blade 31. The fence 69 is moved upon the bars 70 to a position in which it bears against the outer edge of the lumber piece on the other side of the blade 31 to help in holding the piece in proper alignment as it passes through the rollers 34 and 35.

As the lumber piece is pulled onto the table 15 by the rollers 34 and 35, its leading end strikes the upper portion of the trip arm 84, rotating it in the direction away from the rollers 34 and 35 as the piece moves on to be slidably supported on the support 73. The rotation of the arm 84 causes its lower end to move toward the rollers 34 and 35, pulling the rod 85 in that direction, and causing pivotal movement of the lever 82, against the urging of the spring 83, in the direction to raise the upper end of the lever 82 and the portion of the resilient plate 81 supported thereon above the level of the adjacent conveyor beds. As the lumber piece advances on the table, it bends slightly to follow the downward slope of the table and the leading end portion reaches and rests upon the plate 81, the piece being thus supported upon the roller 34, the support 73 and the plate 81 in a position above and out of contact with the underlying conveyor beds. As the trailing end of the piece is discharged from the rollers 34 and 35, it rises into alignment with the rest of the piece which has assumed the downward inclination of the table 15, and, thus, allows the trip arm 84 and the lever 82 to return to their normal positions and the plate 81 to move downwardly below the level of the adjacent conveyor beds. The lowering of the leading end of the piece raises the trailing end sufficiently to lift it clear of the support 73 and the support of the lumber piece is thus transferred to the underlying conveyor beds, the part of the piece upon the one side of the blade 31 resting upon the inner portion of the second conveyor bed and the part of the piece on the other side of the blade 31 resting upon the third conveyor bed. The latter portion will now be moved to the complementary side of the table 15 by the action of the third conveyor bed and there dropped to the floor, striking the depending legs 127 of the guide member 125 as it falls and being thus guided to a position upon the floor substantially parallel to the side of the table 15. The other part of the lumber piece will be conducted outwardly by the inner portion of the second conveyor bed to the point at which that bed reaches and extends below the first conveyor bed, at which point the said part of the lumber piece will be transferred to the first conveyor bed. Once upon the first conveyor bed, the part of the lumber piece will be conveyed back to the platform 11 where the operator may receive it and run it through the saws 12 and onto the table 15 again, repeating the process until the original piece has been cut into the desired widths. As parts of the piece are conducted back to the operator upon the first conveyor bed, they are prevented from slipping or sliding from the side of the table 15 by the abutting elements 106, which were raised by the initial setting of the rod 85 and which extend above the level of the first conveyor bed. Upon the last run-through, or at any time when one part of the lumber piece is not to be returned to the operator for resawing, the setting of the rod 85 will be reversed to raise the outer end of the second conveyor bed above the level of the first conveyor bed. The part of the piece falling upon the second conveyor bed will now be conducted directly to the complementary side of the table 15 and dropped to the floor, the depending legs 127 of the members 124 guiding its fall.

If the alternative forms of the first and second conveyor beds, shown in Figures 18, 19 and 20, are used, the part of the lumber piece falling upon the second bed will be conducted to the first bed and will then be conducted back to the operator; if the abutting elements 106 are raised to prevent the portion from being discharged from the side of the table 15. If, however, the abutments 106 are lowered and the stop 114 is raised, the part of the piece will not be able to move back to the platform 11 and the serrations 135 on the rollers 107 will carry it to the edge of the table where it will be dropped to the floor as above described.

What is claimed is:

1. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw, and carried by said table and having one end portion on one side of said blade and spaced from the complementary side of said table and having the other end portion on the other side of said blade and spaced from the other side of said table, for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers, and connected to said table intermediate its ends for rocking movement about a horizontal axis, said trip arm being operatively connected to said plate and operable on engagement with the work pieces as they are being received by said support to shift said plate to its up movement position, conveying means on one side of said separator blade inwardly of said feed rollers and carried by said table for discharging the work pieces delivered from said plate selectively to the end of said table adjacent said feed rollers or from the complementary side of said table, and another conveying means on the other side of said separator blade inwardly of said feed rollers and carried by said table for discharging the work pieces delivered from said plate from the other side of said table.

2. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complementary side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, spring actuable means carried by said table and operatively connected to said plate for urging said plate to its down movement position, conveying means on one side of said separator blade inwardly of said feed rollers and carried by said table for discharging the work pieces delivered from said plate selectively to the end of said table adjacent said feed rollers or from the complementary side of said table, and another conveying means on the other side of said separator blade inwardly of said feed rollers and carried by said table for discharging the work pieces delivered from said plate from the other side of said table.

3. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable on engagement with the work pieces as they are being received by said support to shift said plate to its up movement position, conveying means on one side of said separator blade inwardly of said feed rollers and carried by said table for discharging the work pieces delivered from said plate selectively to the end of said table adjacent said feed rollers or from the complemental side of said table, another conveying means on the other side of said separator blade inwardly of said feed rollers and carried by said table for discharging the work pieces delivered from said plate from the other side of said table, and upstanding abutment means on said one side of said blade and movable to a position above the complemental side of said table when said conveying means discharges the work pieces to the end of said table adjacent said feed rollers and movable to a position below the complemental side of said table when said conveying means discharges the work pieces from the complemental side of said table.

4. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, a first conveyor bed having conveying elements on one side of said blade inwardly of said feed rollers and carried by said table, the conveying elements of said bed being movable longitudinally of said table for discharging the work pieces delivered from said plate to the end of said table adjacent said feed rollers, a second conveyor bed having conveying elements on said one side of said blade inwardly of said feed rollers and carried by said table, the conveying elements of said second conveyor bed being movable transversely of said table for discharging the work pieces delivered from said plate from the complemental side of said table, the conveying elements of said second conveyor bed being shiftable to a position above the level of said first conveyor bed and to a position below the level of said conveyor bed, and another conveying means on the other side of said separator blade inwardly of said feed rollers and carried by said table for discharging the work pieces delivered from said plate from the other side of said table.

5. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, a first conveyor bed having conveying elements on one side of said blade inwardly of said feed rollers and carried by said table, the conveying elements of said bed being movable longitudinally of said table for discharging the work pieces delivered from said plate to the end of said table adjacent said feed rollers, a second conveyor bed having conveying elements on said one side of said blade inwardly of said feed rollers and carried by said table, the conveying elements of said second conveyor bed being movable transversely of said table for discharging the work pieces delivered from said plate from the complemental side of said table, the conveying elements of said second conveyor bed being shiftable to a position above the level of said first conveyor bed and to a position below the level of said conveyor bed, upstanding abutment means carried by said second conveyor bed and movable to a position above the complemental side of said table when the conveying elements of said second conveyor bed is shifted to its position below the level of said first conveyor bed and movable to a position below the complemental side of said table when the conveying elements of said second conveyor bed is shifted to its position above the level of said first conveyor bed, and another conveying means on the other side of said separator blade inwardly of said feed rollers and carried by said table for discharging the work pieces delivered from said plate from the other side of said table.

6. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, a first conveyor bed having conveying elements on one side of said blade inwardly of said feed rollers and carried by said table, said bed being movable longitudinally of the conveying elements of said table for discharging the work pieces delivered from said plate to the end of said table adjacent said feed rollers, a second conveyor bed having conveying elements on said one side of said blade inwardly of said feed rollers and carried by said table, the conveying elements of said second conveyor bed being movable transversely of said table for discharging the work pieces delivered from said plate from the complemental side of said table, the conveying elements of said second conveyor bed being shiftable to a position above the level of said first conveyor bed and to a position below the level of said conveyor bed, and a third conveyor bed having conveying elements on the other side of said blade inwardly of said feed rollers and carried by said table, the conveying elements of said third conveyor bed being movable transversely of said table for discharging the work pieces delivered from said plate from the other side of said table.

7. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift the plate to its up movement position, spring actuable means carried by said table and operatively connected to said plate for urging said plate to its down movement position, conveying means on one side of said separator blade inwardly of said feed rollers and carried by said table for discharging the work pieces delivered from said plate selectively to the end of said table adjacent said rollers or from the complemental side of said table, another conveying means on the other side of said separator blade inwardly of said feed rollers and carried by said table for discharging the work pieces delivered from said plate from the other side of said table, and upstanding guide members arranged along each of the sides of said table and each connected to said table for movement toward and away from the complemental side of said table.

8. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, a first conveyor bed having conveying elements on one side of said blade inwardly of said feed rollers and carried by said table, the conveying elements of said bed being movable longitudinally of said table, a stop at the end of said table adjacent said feed rollers and connected to said table for movement from a horizontal position to a vertical position, said stop upon execution of its movement to the vertical position coacting with means formed on said conveyor bed to discharge the work pieces delivered from said plate from the complemental side of said table, and another conveying means on the other side of said separator blade inwardly of said feed rollers and carried by said table for discharging the work pieces delivered from said plate from the other side of said table.

9. The combination with a machine including a platform, and at least one vertically disposed rotatable saw having a portion projecting above said platform, of a lumber handling table arranged in longitudinal alignment with respect to said saw, said table being movable transversely of said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable on engagement with the work pieces as they are being received by said support to shift said plate to its up movement position, conveying means on one side of said separator blade inwardly of said feed rollers and carried by said table for discharging the work pieces delivered from said plate selectively to the end of said table adjacent said feed rollers or from the complemental side of said table, and another conveying means on the other side of said separator blade inwardly of said feed rollers and carried by said table for discharging the work pieces delivered from said plate from the other side of said table.

10. The combination with a machine including a platform, and at least one vertically disposed rotatable saw having a portion projecting above said platform, of a lumber handling table arranged in longitudinal alignment with respect to said saw, said table being movable transversely of said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable upon engagement with the work pieces as they are being received by said support to shift said plate to its up movement position, spring actuable means carried by said table and operatively connected to said plate for urging said plate to its down movement position, conveying means on one side of said separator blade inwardly of said feed rollers and carried by said table for discharging the work pieces delivered from said plate selectively to the end of said table adjacent said feed rollers or from the complemental side of said table, and another conveying means on the other side of said separator blade inwardly of said feed rollers and carried by said table for discharging the work pieces delivered from said plate from the other side of said table.

11. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable on engagement with the work pieces as they are being received by said support to shift said plate to its up movement position, and conveying means inwardly of said feed rollers and carried by said table for discharging the work pieces delivered from said plate selectively to the end of said table adjacent said feed rollers or a side of said table.

12. The combination with a machine including a platform, and at least one vertically disposed rotatable saw having a portion projecting above said platform, of a lumber handling table arranged in longitudinal alignment with respect to said saw, an upstanding separator blade positioned longitudinally of and spaced above said table intermediate the sides thereof and carried by said table, feed rollers disposed one above the other positioned transversely of said table adjacent the end thereof contiguous to said saw and carried by said table and having one end portion on one side of said blade and spaced from the complemental side of said table and having the other end portion on the other side of said blade and spaced from the other side of said table for pulling sawed lumber pieces onto said table, an upstanding support fixedly carried by said table arranged inwardly of and in spaced parallel relation with respect to said rollers for supporting the lumber pieces as they are being pulled through said feed rollers, an upright resilient plate arranged inwardly of and in spaced parallel relation with respect to said support and connected to said table for up and down movement about a fixed horizontal axis for supporting the work pieces as they are received from said support, an upstanding trip arm positioned between and in parallel spaced relation with respect to said support and said feed rollers and connected to said table intermediate its ends for rocking movement about a horizontal axis, said trip arm being operatively connected to said plate and operable on engagement with the work pieces as they are being received by said support to shift said plate to its up movement position, and conveying means inwardly of said feed rollers and carried by said table for discharging the work pieces delivered from said plate selectively to the end of said table adjacent said feed rollers or a side of said table, and upstanding abutment means on said one side of said blade and movable to a position above the complemental side of said table when said conveying means discharges the work pieces to the end of said table adjacent said feed rollers and movable to a position below the complemental side of said table when said conveying means discharges the work pieces from the complemental side of said table.

References Cited in the file of this patent

UNITED STATES PATENTS

| Number | Name | Date |
|---|---|---|
| 715,054 | Graham | Dec. 2, 1902 |
| 811,009 | Walton | Jan. 30, 1906 |
| 1,132,840 | Garrett | Mar. 23, 1915 |
| 1,803,857 | Lumb | May 5, 1931 |
| 2,353,239 | Horstkotte | July 11, 1944 |
| 2,669,263 | Smith | Feb. 16, 1954 |

FOREIGN PATENTS

| Number | Country | Date |
|---|---|---|
| 109,614 | Sweden | Jan. 25, 1944 |